United States Patent [19]

Tamura et al.

[11] 4,402,859

[45] Sep. 6, 1983

[54] PROCESS FOR PRODUCING DIARYLAMINE ANTIOXIDANTS IN GLOBULAR FORM

[75] Inventors: Takashi Tamura, Kobe; Yoichi Kojima, Kashihara, both of Japan

[73] Assignee: Sumitomo Chemical Co., Ltd., Osaka, Japan

[21] Appl. No.: 358,790

[22] Filed: Mar. 16, 1982

[30] Foreign Application Priority Data

Mar. 24, 1981 [JP] Japan .................................. 56-43546
Jun. 5, 1981 [JP] Japan .................................. 56-87128
Oct. 29, 1981 [JP] Japan .............................. 56-174044
Dec. 8, 1981 [JP] Japan .............................. 56-198033

[51] Int. Cl.³ ............................................. C09K 15/16
[52] U.S. Cl. .................................... 252/401; 252/403; 524/907
[58] Field of Search ........................ 252/401; 523/223; 524/907, 908

[56] References Cited

FOREIGN PATENT DOCUMENTS 52-39738 3/1977 Japan .

*Primary Examiner*—Lewis T. Jacobs
*Attorney, Agent, or Firm*—Wenderoth, Lind & Ponack

[57] ABSTRACT

The present invention is directed to a process for producing a diarylamine antioxidant in globular form characterized by adding a diarylamine antioxidant in a molten state to an aqueous solution of a surface-active agent, stirring the solution and solidifying the antioxidant by cooling.

13 Claims, No Drawings

PROCESS FOR PRODUCING DIARYLAMINE ANTIOXIDANTS IN GLOBULAR FORM

The present invention relates to a process for producing a diarylamine antioxidant in globular form, and more particularly to a process for producing a diarylamine antioxidant in globular form characterized by adding a diarylamine antioxidant in a molten state to an aqueous solution of a surface-active agent, stirring the solution and solidifying the antioxidant by cooling. The object of the process is to obtain a product in globular form which is excellent in flowability and is resistant to crumbling.

Diarylamine antioxidants for rubbers which are solid at room temperature such as N-isopropyl-N'-phenyl-p-phenylenediamine, N-1,3-dimethylbutyl-N'-phenyl-p-phenylenediamine, N,N'-diphenyl-p-phenylenediamine, N,N'-ditolyl-p-phenylenediamine, N-phenyl-$\alpha$-naphthylamine, etc. are commercialized in the form of flakes or rods. All of these are liable to crumble away and be powdered during transportation so that the powder is scattered upon use, which undesirably affects the working environment. Especially in a low-melting point compound like N-1,3-dimethylbutyl-N'-phenyl-p-phenylenediamine, a small quantity of powder tends to agglomerate to form a mass so that it is necessary to remove the fine powder from the product by sieving. This results in a remarkable decrease of yield, and it is necessary to heighten the melting point of the surface of the product and to fill the product into a rigid container to prevent it from crumbling during transportation.

In recent years, there has been progress in automatic weighing in the compounding process in tire production and other rubber industries. Accompanied with this, there has arisen a need for weighing and supplying the antioxidants continuously and in definite quantities. Further, an improvement is being attempted wherein several kinds of ingredients are previously mixed uniformly. However, the conventional forms of products, namely flake or rod forms, are lacking in flowability so that it was difficult to weigh and supply them in constant quantities, and also they are inferior in miscibility in the compounding pretreatment.

To shape an antioxidant into globular form, one may think of a method which comprises pelleting the antioxidant and then globularizing it by a Marumerizer; or a method which comprises dropping the antioxidant onto a belt flaker to solidify and semiglobularizing it, etc. However, these methods necessitate a special machine, and require a large cost of equipment in order to increase the productivity. A method of producing a globular product (Japanese Patent Publn. No. 3210/73) is also known which comprises adding dropwise an amine organic compound in a molten state into an aqueous solution of a hydrophilic high molecular compound, e.g. albumin, methyl cellulose, gelatine, etc. and solidifying the dispersed particles by cooling under stirring. However, this method necessitates a large quantity of a hydrophilic high molecular compound, resulting in a product of inferior quality and as a result of the small quantity of amine compound, the yield of the globular product is very low and the product is liable to crumble, thus producing a large quantity of fine powder.

Additionally, Japanese Patent Kokai No. 62245/79 describes a method wherein an organic rubber chemical in powder form is dispersed and heated in water containing 0–30% by weight of an organic solvent and is shaped. However, this method necessitates two steps, namely the step of taking out the product once as a solid and pulverizing it, and the step of making it muddy and then drying it. This results in a large loss of time and money. However, this method has the disadvantage of necessitating the use of organic solvents.

In such a situation, we made an intensive study on a process for obtaining diarylamine antioxidants for rubbers, which are excellent in flowability and resistant to crumbling, in globular form and are of a constant particle diameter, and are low in cost and produced easily in a good yield. This study resulted in the accomplishment of the present invention.

Accordingly, the present invention is a process for producing a diarylamine antioxidant in globular form characterized by adding a diarylamine antioxidant in a molten state into an aqueous solution of a surface-active agent, stirring the solution and solidifying it by cooling.

A process resembling the process of the present invention is known as Japanese Patent Kokai No. 39738/77 wherein a polymeric antioxidant in a molten state is added dropwise from a nozzle to an aqueous solution of a surface-active agent and is cooled rapidly and solidified in the aqueous solution. This process, however, is limited to the use of polymeric antioxidants, and the diameter of the product is determined by the type of the nozzle used and the pressure applied. Furthermore, solidification by rapid cooling is a prerequisite for this process.

The process of the present invention is a process particularly effective for globularizing diarylamine monomeric antioxidants which has a slow solidification speed. The shape of the product, such as the diameter, does not depend on the type of the nozzle used or the pressure applied, but a globular product having a diameter of about 1 to 6 mm is obtained in good yield, in compliance with the cooling speed and the intensity of stirring.

In the present invention, various kinds of surface-active agents are used, which include amphoteric surface-active agents of aminocarboxylic acid or salt type (e.g. N-alkylaminoalkyl carboxylic acid, N,N-dialkylaminoalkyl carboxylic acid, N-alkylamino-N,N-bisalkyl carboxylic acid or their salts), 2-alkyl-N-carboxyalkyl-N-hydroxyethylimidazolinium betaine type, etc.; anionic surface-active agents of alkyloylmethylamino carboxylate type, alkyl sulfate type, alkylaryl sulfonate type, alkylnaphthalene sulfonate type, sulfosuccinate type, polyoxyethylene alkyl (or alkylaryl) sulfate type, etc.; cationic surface-active agents of tetraalkylammonium chloride type, benzyltrialkylammonium chloride type, polyoxyethylene alkylamine type, alkylamine salt type, etc.; and nonionic surface-active agents of polyoxyethylene alkylphenol ether type, polyoxyethylene acylester type, fatty acid alkylolamide type, fatty acid alkylolamide ethylene oxide addition product type, etc.

Concrete examples of these surface-active agents are as follows:

Amphoteric Surface-Active Agents

N-lauryl-N,N-dimethyl-$\alpha$-carboxylic acid betaine, N-tetradecyl-N,N-dimethyl-$\alpha$-carboxylic acid betaine, alkali salts of N-tetradecylamino-N,N-bispropionic acid, N,N-dilaurylaminopropionic acid, N-lauryl-$\beta$-aminopropionic acid, N-laurylamino-N,N-bis-propionic acid, etc., 2-lauryl-N-carboxymethyl-N-hydroxyethylimidazolinium betaine, 2-tetradecyl-N-carboxyethyl-N-hydroxyethylimidazolinium betaine, Anionic Surface-Active Agents Sodium salt of N-lauroyl-N-methyl-β-alanine, sodium salt of cocoylsarcocine, ammonium lauryl sulfate, sodium dodecylbenzene sulfonate, sodium dodecylnaphthalene sulfonate, sodium dioctylsulfosuccinate, sodium polyoxyethylene lauryl ether sulfate, sodium polyoxyethylene nonylphenol ether sulfate, Cationic Surface-Active Agents lauryltrimethylammonium chloride, stearyltrimethylammonium chloride, cocoylbenzyldimethylammonium chloride, laurylpicolinium chloride, polyoxyethylene laurylamine, laurylamine acetate, Nonionic Surface-Active Agents polyoxyethylene lauryl ether, polyoxyethylene nonylphenyl ether, lauric acid diethanolamide, addition product of coconut oil fatty acid monoethanolamide and ethylene oxide addition product, polyethylene glycol monooleate.

These surface-active agents are used singly or as a mixture of two or more. Among these, amphoteric surface-active agents are better for use in view of their having wide operational tolerance limits, that is to say, the ease of regulating particle sizes, the ease of inhibiting the particles from adhering to the instrument wall or the stirrer.

When the diaryamine antioxidant in a molten state is added to an aqueous solution of surface-active agent under stirring according to the process of the present invention, the molten antioxidant is dispersed as globular particles in the course until its solidification so that the agglomeration of the dispersed particles by their mutual adhesion is prevented. Thus the antioxidant is formed into globular bodies, the formation of fine particles being controlled to a minimum. Moreover, the decrease in yield due to adherence to the instrument wall and stirrer is suppressed.

In the process of the present invention, the quantity to be used of the surface-active agent is generally about 0.001 to 5 weight % of the aqueous solution and preferably about 0.01 to 2 weight %.

The diarylamine antioxidants for rubbers applied to the present invention are those known up to now which are solid at room temperature, and among others N-isopropyl-N'-phenyl-p-phenylenediamine, N-1,3-dimethylbutyl-N'-phenyl-p-phenylenediamine, N,N'-diphenyl-p-phenylenediamine, N,N'-ditolyl-p-phenylenediamine, and N-phenyl-α-naphthylamine are effectively applied.

The pH of the aqueous solution differs depending on the kind of the surface-active agent to be used and on the kind of the diarylamine antioxidant to be applied, but it lies generally in the range of about 5 to 13 and, preferably in the range of about 6 to 10.

As regards the temperature of the aqueous solution, the temperature is satisfactory so far as it is below the solidification point of the diarylamine antioxidant to be applied. The cooling speed and the intensity of stirring can be changed arbitrarily, by which the particle size of the dispersed particles can be regulated.

The addition of seed crystals into the aqueous solution or into the molten diarylamine antioxidant is effective in accelerating the solidification speed.

The method of adding the molten diarylamine antioxidant into the aqueous solution is not particularly limited, and the antioxidant may be added slowly or rapidly.

The weight ratio of the molten diarylamine antioxidant to the aqueous solution is about 5 to 40 weight %, preferably about 10 to 30 weight %, as a slurry concentration of the globular product produced.

In the present invention, a defoaming agent may be added to the aqueous solution, if necessary. Also, different kinds of surface-active agents may be used in combination in order to display the characteristics of each surface-active agent more effectively. Additionally, other chemicals may be added in order to improve the function of the diarylamine antioxidant to provide a different function to the antioxidant.

Thus, the diarylamine antioxidant in a molten state is dispersed in the aqueous solution as dispersed particles having a desired diameter. After the solidified globular particles are separated from the aqueous solution, and when the separated particles are washed and dried, there can be obtained in good yield a globular product having a diameter of about 1 to 6 mm, excellent in flowability, resistant to massing and crumbling, and suitable for continuous weighing supply and uniform compounding.

In the following, the present invention will be explained by examples, wherein parts are given by weight.

EXAMPLE 1

One hundred parts of N-1,3-dimethylbutyl-N'-phenyl-p-phenylenediamine in a molten state was added to an aqueous solution of 40° C. consisting of 500 parts of water and 0.5 part of N-lauryl-N,N-dimethyl-α-carboxylic acid betaine. By stirring at room temperature for 40 minutes, the dispersed particles were completely solidified. After filtration, washing and drying, 98 parts of a globular product was obtained which was excellent in flowability and resistant to crumbling, and had a melting point of 50° C. and a diameter of 1 to 6 mm.

EXAMPLE 2

One hundred parts of N-1,3-dimethylbutyl-N'-phenyl-p-phenylenediamine was added to an aqueous solution of 45° C. composed of 0.2 part of 2-lauryl-N-carboxyethyl-N-hydroxyethylimidazolinium betaine and 500 parts of water. By stirring at room temperature for 60 minutes, completely solidified globular particles were generated. After filtration, washing and drying, there was obtained 99 parts of a globular product having a melting point of 50° C. and a diameter of 1 to 5 mm.

EXAMPLES 3 TO 23

In compliance with Example 1 and under the conditions shown in Table 1, various diarylamines were globularized. In the Table, NDBNPP and NIPNPP are abbreviations of the following diarylamine antioxidants:
NDBNPP: N-1,3-dimethylbutyl-N'-phenyl-p-phenylenediamine
NIPNPP: N-isopropyl-N'-phenyl-p-phenylenediamine

TABLE 1

| Example No. | Amine antioxidant Kind | Amine antioxidant Quantity used (pts.) | Aqueous solution of surface-active agent Surface-active agent Kind | Aqueous solution of surface-active agent Surface-active agent Quantity used (pts.) | Quantity of water (pts.) | Temp. of aq. soln. (°C.) | Stirring condition Time (min.) | Stirring condition Temp. | Globular product Yield (pts.) | Globular product M.P. (°C.) | Globular product Particle diameter (mm.) |
|---|---|---|---|---|---|---|---|---|---|---|---|
| 3 | NIPNPP | 100 | disodium N—lauryl-amino-N,N—bispropionate | 0.15 | 400 | 65 | 20 | room temp. | 97 | 75 | 1-4 |
| 4 | NDBNPP | " | disodium N—cocoyl-amino-N,N—bispropionate / polyoxyethylene nonylphenol ether (ethylene oxide addition mol number = 5) | 0.05 / 0.5 | 500 | 45 | 15 | room temp. | 99 | 50 | 1-6 |
| 5 | NIPNPP | " | N,N—dimethyl-N—laurylaminoacetic acid betaine | 0.5 | 550 | 67 | 20 | room temp. | 97 | 75 | 1-4 |
| 6 | NDBNPP | " | ammonium lauryl sulfate | 0.5 | 500 | 40 | 30 | room temp. | 98 | 50 | 1-6 |
| 7 | NDBNPP | " | sodium polyoxyethylene lauryl ether sulfate (ethylene oxide addition mol number = 3) | 0.3 | 500 | 40 | 30 | room temp. | 98 | 50 | 1-5 |
| 8 | NIPNPP | " | sodium dodecylbenzene sulfonate | 0.3 | 400 | 70 | 20 | room temp. | 96 | 75 | 1-4 |
| 9 | NIPNPP | " | sodium dioctyl sulfosuccinate | 0.2 | 500 | 70 | 20 | room temp. | 98 | 75 | 1-4 |
| 10 | NDBNPP | " | sodium dodecylnaphthalene sulfonate | 0.5 | 500 | 45 | 60 | room temp. | 97 | 50 | 1-5 |
| 11 | NIPNPP | " | sodium polyoxyethylene nonylphenyl ether sulfate (ethylene oxide addition mol number = 3) | 0.15 | 400 | 70 | 20 | room temp. | 98 | 75 | 1-4 |
| 12 | NDBNPP | " | polyoxyethylene laurylamine (ethylene oxide addition mol number = 5) | 0.6 | 500 | 40 | 30 | room temp. | 98 | 50 | 1-5 |
| 13 | NDBNPP | " | lauryltrimethylammonium chloride | 0.6 | 500 | 40 | 30 | room temp. | 96 | 50 | 1-6 |
| 14 | NIPNPP | " | laurylamine acetate | 1.5 | 600 | 70 | 20 | room temp. | 96 | 75 | 1-4 |
| 15 | NIPNPP | " | stearyltrimethylammonium chloride | 1.0 | 400 | 70 | 20 | room temp. | 98 | 75 | 1-4 |
| 16 | NDBNPP | " | laurylpicolinium chloride | 1.5 | 500 | 45 | 40 | room temp. | 97 | 50 | 1-6 |
| 17 | NDBNPP | " | cocoylbenzyldimethyl ammonium chloride | 1.5 | 500 | 45 | 60 | room temp. | 96 | 50 | 1-5 |
| 18 | NDBNPP | " | polyoxyethylene nonylphenyl ether (ethylene oxide addition mol number = 5) | 1.3 | 500 | 40 | 30 | room temp. | 95 | 50 | 1-6 |
| 19 | NIPNPP | " | polyoxyethylene lauryl ether (ethylene oxide addition mol number = 50) | 0.8 | 400 | 70 | 20 | room temp. | 96 | 75 | 1-4 |
| 20 | NIPNPP | " | polyethylene glycol distearate (ethylene oxide addition mol number = 100) | 1.5 | 500 | 70 | 20 | room temp. | 97 | 75 | 1-4 |
| 21 | NIPNPP | " | polyethylene glycol monooleate (ethylene oxide addition mol number = 10) | 1.2 | 400 | 42 | 30 | room temp. | 97 | 75 | 1-6 |
| 22 | NDBNPP | " | coconut oil fatty acid diethanolamide | 1.0 | 500 | 40 | 60 | room temp. | 99 | 50 | 1-5 |

TABLE 1-continued

| Example No. | Amine antioxidant Kind | Quantity used (pts.) | Aqueous solution of surface-active agent Surface-active agent Kind | Quantity used (pts.) | Quantity of water (pts.) | Temp. of aq. soln. (°C.) | Stirring condition Time (min.) | Stirring condition Temp. | Globular product Yield (pts.) | M.P. (°C.) | Particle diameter (mm.) |
|---|---|---|---|---|---|---|---|---|---|---|---|
| 23 | NDBNPP | " | coconut oil fatty acid monoethanol-amide ethylene oxide addition product (ethylene oxide addition mol number = 2) | 1.2 | 500 | 40 | 60 | room temp. | 97 | 50 | 1–5 |

EXAMPLE 24

One hundred parts of N-1,3-dimethylbutyl-N'-phenyl-p-phenylenediamine in a molten state was added to an aqueous solution of 45° C. composed of 0.3 part of cocoylsarcosine sodium salt and 500 parts of water. Further, as seed crystals, one part of N-1,3-dimethylbutyl-N'-phenyl-p-phenylenediamine in a fine crystal state was added. By stirring at room temperature for 50 minutes, completely solidified globular particles were generated. After filtration, washing and drying, 99 parts of a globular product having a melting point of 50° C. and a diameter of 1 to 5 mm was obtained.

EXAMPLE 25

One hundred parts of N-isopropyl-N'-phenyl-p-phenylenediamine in a molten state was added to an aqueous solution of 70° C. composed of 500 parts of water and one part of polyoxyethylene nonylphenyl ester (ethylene oxide addition mol number=100). Further, as seed crystals, one part of N-isopropyl-N'-phenyl-p-phenylenediamine was added. By stirring at room temperature for 19 minutes, the dispersed particles were completely solidifed. After filtration, washing and drying, 97 parts of a globular product having a melting point of 75° C. and a diameter of 1 to 4 mm was obtained.

EXAMPLE 26

One hundred parts of N-isopropyl-N'-phenyl-p-phenylenediamine was added to an aqueous solution of 65° C. composed of 400 parts of water, 0.3 part of N-lauroyl-N-methyl-β-alanine sodium salt and 0.05 part of TSA-730 (silicone defoaming agent; product of Toshiba Silicone Co.). By stirring the solution at room temperature for 19 minutes, the dispersed particles were completely solidified. After filtration, washing and drying, 97.5 parts of a globular product having a melting point of 75° C. and a diameter of 1 to 4 mm was obtained.

What is claimed is:

1. A process for producing a diarylamine antioxidant in globular form which comprises adding a diarylamine antioxidant in a molten state to an aqueous solution of a surface-active agent, stirring the solution and solidifying the antioxidant by cooling, wherein the concentration of the surface-active agent in the aqueous solution is 0.001 to 5 weight % and the ratio by weight of the diarylamine antioxidant to the aqueous solution of the surface active agent is from 5 to 40 weight % as a slurry concentration of the generated globular product, said aqueous solution having a pH in the range of 5 to 13 and wherein the temperature of the aqueous solution is below the solidification point of the added diarylamine antioxidant.

2. The process as claimed in claim 1 wherein the concentration of the surface-active agent in the aqueous solution is 0.01 to 2 weight %.

3. The process as claimed in claim 1 wherein the pH of the aqueous solution is in the range of 6 to 10.

4. The process as claimed in claim 1 wherein the diarylamine antioxidant is N-isopropyl-N'-phenyl-p-phenylenediamine or N-1,3-dimethylbutyl-N'-phenyl-p-phenylenediamine.

5. The process as claimed in claim 1 wherein the diarylamine antioxidant is N-1,3-dimethylbutyl-N'-phenyl-p-phenylenediamine.

6. The process as claimed in claim 1 wherein the ratio by weight of the diarylamine antioxidant to the aqueous solution of the surface-active agent is from from 10 to 30 weight %, as a slurry concentration of the generated globular product.

7. The process as claimed in claim 1 wherein an amphoteric surface-active agent is used as the surface-active agent.

8. The process as claimed in claim 7 wherein the amphoteric surface-active agent is of N,N,N-trialkyl-N-carboxyalkylammonium betaine type, aminocarboxylic acid salt type, or imidazolinium type.

9. The process as claimed in claim 1 wherein an anionic surface-active agent is used as the surface-active agent.

10. The process as claimed in claim 1 wherein an cationic surface-active agent is used as the surface-active agent.

11. The process as claimed in claim 1 wherein, together with the diarylamine antioxidant in a molten state, seed crystals of said antioxidant are added to the aqueous solution.

12. The process as claimed in claim 1 wherein a defoaming agent is added to the aqueous solution.

13. Diarylamine antioxidants in globular form obtained by the process of claim 1.

* * * * *